INTERTRAFFIC EQUIPMENT FOR LOUDSPEAKER PRIVATE BRANCH EXCHANGES

Filed Aug. 16, 1965 4 Sheets-Sheet 1

INTERTRAFFIC EQUIPMENT FOR LOUDSPEAKER PRIVATE BRANCH EXCHANGES

Filed Aug. 16, 1965 4 Sheets-Sheet 2

United States Patent Office 3,482,050
Patented Dec. 2, 1969

3,482,050

INTERTRAFFIC EQUIPMENT FOR LOUDSPEAKER PRIVATE BRANCH EXCHANGES

Per Gustaf Jonsson, Sorlid, Ronninge, and Arne Bogestam, Farsta, Sweden, assignors to International Standard Electric Corporation, New York, N.Y., a corporation of Delaware Filed Aug. 16, 1965, Ser. No. 479,709
Claims priority, application Sweden, Aug. 17, 1964, 9,894/64
Int. Cl. H04m *3/34;* H04b *3/32*
U.S. Cl. 179—16 1 Claim

ABSTRACT OF THE DISCLOSURE

Intertraffic equipment for loudspeaker private branch exchanges is provided. The intertraffic equipment includes a compression amplifier at an outgoing exchange having its input connected to the central amplifier in the outgoing exchange and its output connected over a hybrid coil circuit to the trunk line operating towards the receiving exchange. The compression amplifier is adapted to reduce the voltage supplied from the outgoing exchange to the trunk line to a zero level on said trunk line. A pre-amplifier is positioned at the receiving exchange having its input connected to the trunk line over a hybrid coil circuit and its output connected to the central amplifier in the receiving exchange. The pre-amplifier is adapted to increase the voltage received from the trunk line to an appropriate level for the central amplifier.

This invention relates to intertraffic telephone equipment and particularly to intertraffic telephone equipment for loudspeaker private branch exchanges.

The trunks between two loudspeaker private branch telephone exchanges of the type in question comprise two-wire trunk lines. In order to make possible traffic between two exchanges each designed on a four-wire basis over these two-wire trunk lines intertraffic equipment is necessary for adapting the four-wire network to the two-wire trunks. As the two-wire trunks are included in cables also containing ordinary wire pairs for conventional telephone equipment and these wire pairs might be subject to cross-talk noises if the total power provided by a central amplifier in a loudspeaker private branch exchange were to be supplied to the trunks, certain precautions must be taken in this respect.

Intertraffic equipment designed in accordance with the present invention and intended for use by traffic between two loudspeaker private branch exchanges each designed on a four-wire basis and having centralized amplifier equipment is characterized substantially by the intertraffic equipment comprising on one hand a compression amplifier positioned at the outgoing exchange and on the other hand a pre-amplifier positioned at the receiving end. The compression amplifier has its input connected to the central amplifier in the outgoing exchange and its output connected over a hybrid coil circuit to the trunk line operating towards the receiving exchange. The compression amplifier is adapted to reduce the voltage supplied from the outgoing exchange to the trunk line to a zero level on said trunk line. The pre-amplifier is positioned at the receiving exchange and has its input connected to the trunk line over a hybrid coil circuit and its output connected to the central amplifier in the receiving exchange. The pre-amplifier is adapted to increase the voltage received from the trunk line to an appropriate level for the central amplifier. Furthermore, the intertraffic equipment of the invention is characterized in that release of the trunk line, which is free of voltage during conversation, is accomplished by means of a release pulse derived from the disconnecting exchange and being adapted to be received by a receiving relay positioned in the other exchange and connected in parallel over the line wires and adapted for initiating release.

Figure 1:
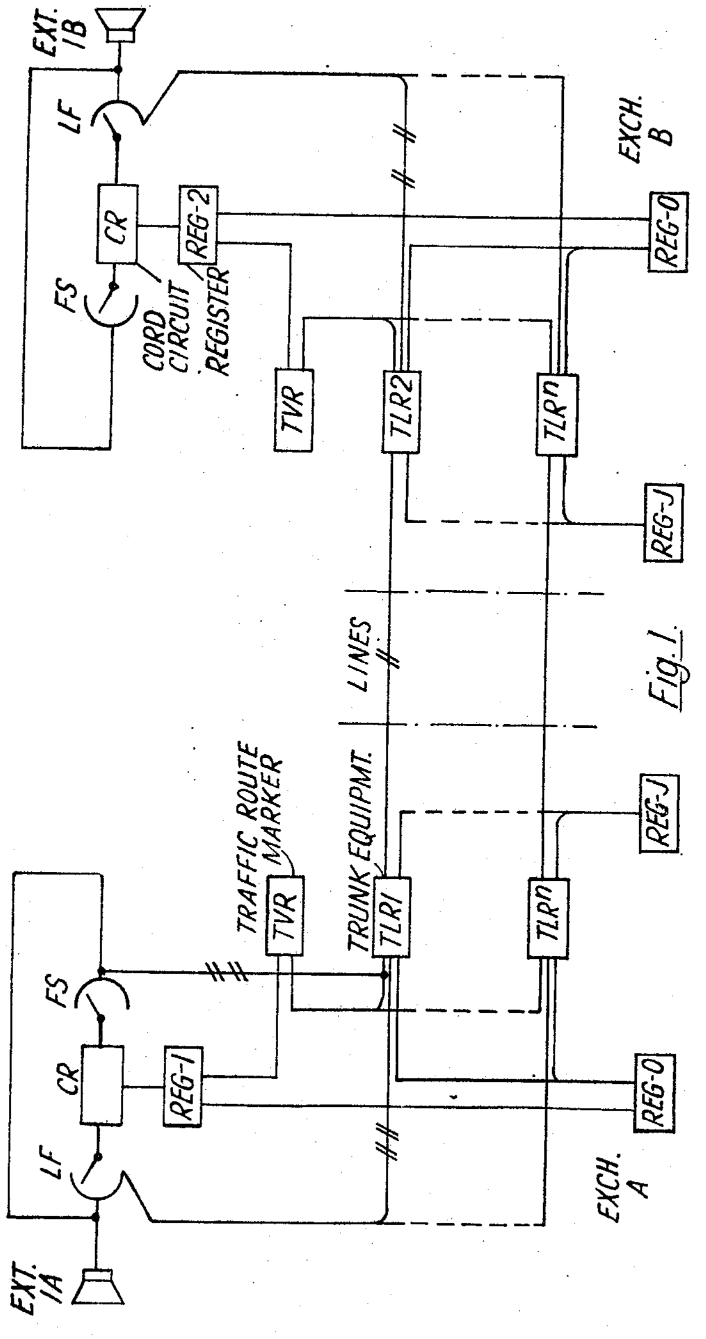
Figure 2:
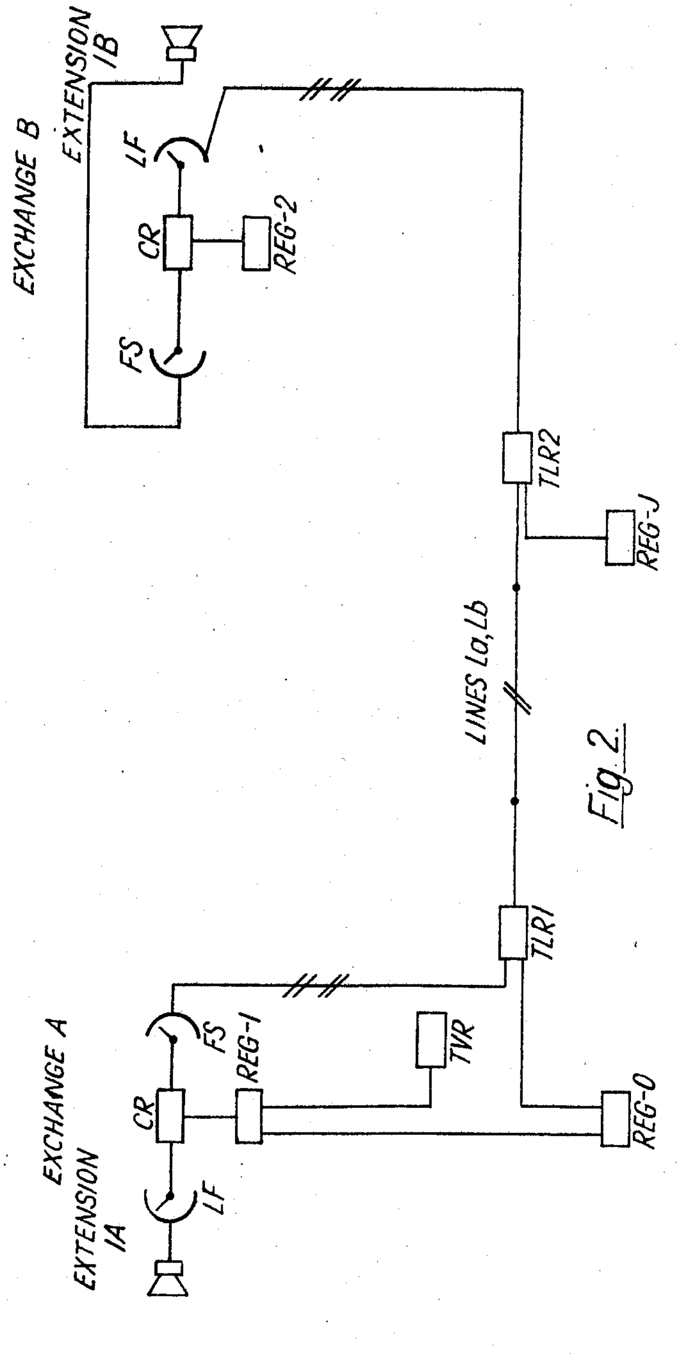
Figure 3:
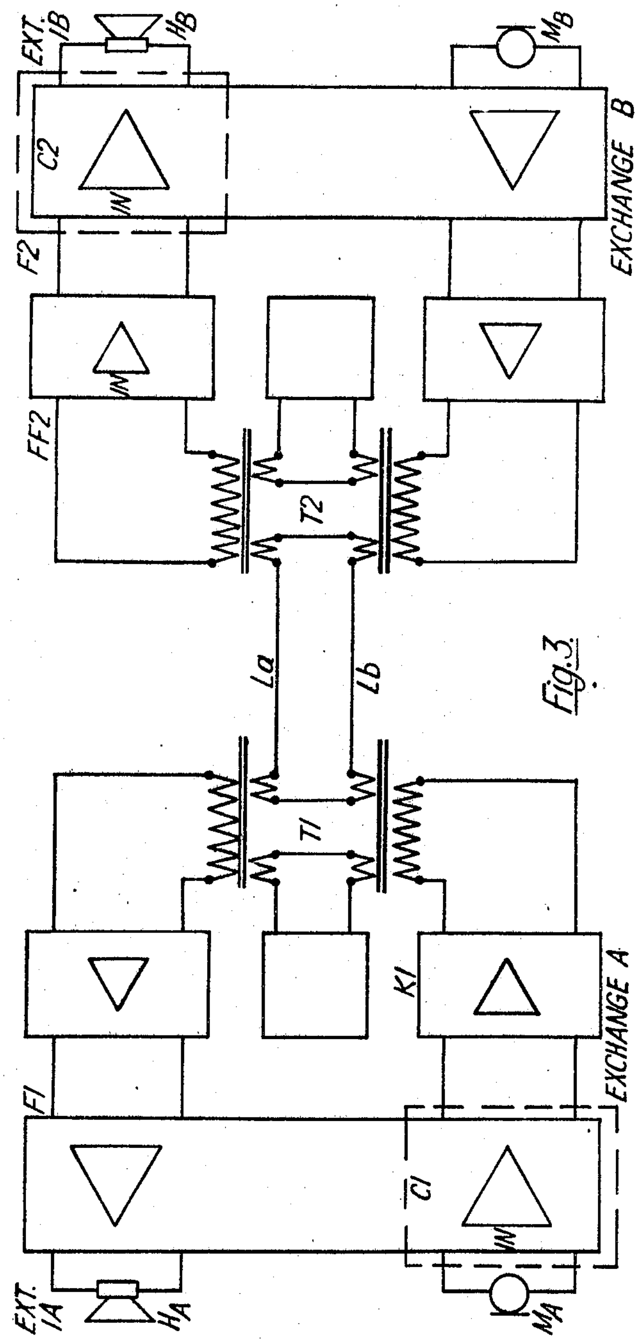
Figure 4:
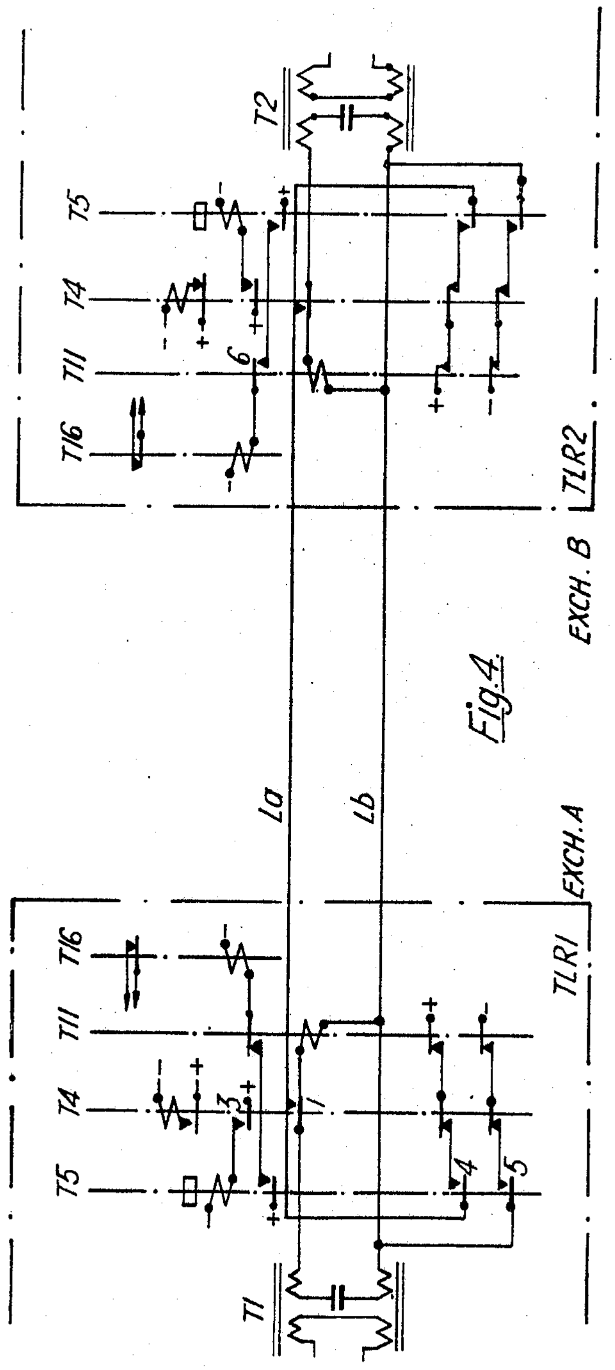

The invention will be described in detail in the following with reference to the accompanying drawings, in which FIG. 1 shows a block diagram of equipment assembled in accordance with the invention, FIG. 2 shows an established speech connection between an extension in an exchange A and an extension in an exchange B, and FIG. 3 shows in principle the centralized amplifier equipment of exchanges A and B connected to one extension on the A-side and one extension on the B-side, respectively, together with the line wires connecting the amplifiers. FIG. 4, finally, is a circuit diagram illustrating the method of releasing a speech connection.

The equpment illustrated by FIG. 1 includes two private branch exchanges A and B provided with intertraffic equipment in accordance with the invention.

Each of the exchanges is provided with a number of extensions, with one of these on the transmitting side and one on the receiving side being indicated by means of the respective loudspeaker symbols 1A and 1B. Furthermore, there are line finders LF, final selectors FS, cord circuits CR and local registers REG–1 and REG–2, respectively. The exchanges are connected to each other by means of two-wire lines, which at their ends are terminated by trunk equipment, with one equipment (TLR1) being illustrated for the transmitting side and one (TLR2) for the receiving side. Selection of unoccupied or free trunk equipment is effected by means of a traffic route marker TVR. The trunks in each exchange are also provided with transmitting registers REG–O and receiving registers REG–J.

FIG. 2 shows a block diagram which in principle has been cut out of the diagram shown in FIG. 1 with FIG. 2 illustrating the switching path of a call between an extension in exchange A and an extension in exchange B.

In principle a connection from a calling extension 1A, i.e. a loud-speaking set, in exchange A to a calling extension 1B in exchange B is established in the following manner, under the assumption that trunk equipment TLR1 is unoccupied and that register REG–O in exchange A and register REG–J in exchange B are unoccupied. (Compare FIGS. 1 and 2.)

A call is initiated in conventional manner by the caller at extension 1A being connected over line finder LF and cord circuit CR to the local register REG–1 of exchange A when he presses his call button. When the caller has keyed the number of the called extension and this number has been received in the local register the traffic route marker TVR is called in and connects register REG–O, to which the number of the called extension is transferred and in which said number is registered. After this registration, trunk equipment TLR1 is connected over line wires L*a* and L*b* to a TLR2 in the receiving exchange. This TLR2 is connected to the switching equipment of exchange B in the same manner as an extension associated with exchange B. Simultaneously, receiving register REG–J of exchange B is connected to TLR2. REG–2 is connected to the switching equipment of loudspeaker private branch exchange B and signals REG–O of exchange A that REG–2 is prepared to receive digit pulses. Pulses corresponding to the number of the called extension are then transferred from REG–O to REG–J.

The digit pulses are converted to a direct current code in REG–J and said code is transferred to the local register REG–2 of the extension in exchange B. When this operation is completed the number of the extension will have been transferred to private branch exchange B, and thereafter connection is effected in conventional manner to the extension designated. TVR, REG–1, REG–2, REG–O and REG–J now release. An established connection will thus include the initiating extension connected over switching equipment with its associated speech channel, also trunk equipment TLR1, line wires L*a* and L*b*, interworking trunk equipment TLR2 and switching equipment and speech channel in exchange B, and finally the calling extension.

However, in accordance with requirements no high speech voltages must be supplied to the line, and the voltage must lie below the zero level. The loudspeaking telephone system has an amplifier in the speech channel (i.e. the cord circuit CR) which normally supplies a very high voltage on the output side, and this voltage must thus not be sent out on the line wires and has to be reduced. In accordance with the invention this is accomplished by the method illustrated in FIG. 3 by means of a compression amplifier and a hybrid network, whereby a zero level always can be maintained on the line wires irrespective of the voltage that the amplifier supplies. When this zero level is received at the incoming trunk equipment and is fed on to the speech channel in exchange B, it will be too low for the input to the central amplifier in exchange B. For this reason a pre-amplifier is linked into the trunk equipment on the B-side and increases the incoming level of the line wires to an appropriate level for the input to the central amplifier.

FIG. 3 illustrates the speech transmission from microphone $M_A$ to loudspeaker $H_B$. The microphone is connected to the input side IN of the outgoing speech channel C1 in a central amplifier F1, and the outlet from said speech channel is connected to the inlet of a compression amplifier K1, the outlet of which in turn is connected to a hybrid coil T1 balanced in the usual manner. Line wires L*a* and L*b* connect coil T1 to a hybrid coil T2 in exchange B. The last-mentioned coil is connected to a pre-amplifier FF2 which in turn is connected to the incoming speech channel C2 in the amplifier F2 of exchange B, with the output side of said amplifier being connected to loudspeaker $H_B$ in extension 1B. The individual amplifiers are shown completely separated from the connecting means of the exchange in FIG. 3, but in practice they can be positioned in any one of these, for instance in cord circuit CR.

In a conversation the power from microphone $M_A$ will cause a large ouput voltage from amplifier channel C1. In compression amplifier K1 this voltage will be attenuated to such a value that the voltage appearing on line wires L*a* and L*b* will not exceed the permitted zero level, for instance 0.775 volt. On the receiving side the line voltage will be transformed over to the inlet of amplifier FF2, wherein the voltage will be amplified to an appropriate level. This amplified voltage will then be transferred to the input of the incoming speech channel C2, where it will be amplified additionally, whereafter it will be supplied to loudspeaker $H_B$. Thereby the same voltage will have been attained at loudspeaker $H_B$ as between speech channel C1 and compression amplifier K1 of exchange A.

Conventionally, an established connection is maintained by means of a direct current loop between the subscribers, and release is accomplished by opening said loop so that the relays of both sides are disconnected. However, this method of approach has the drawback in the call connection of the instant invention that if a direct curent is supplied from a rectifier connected to the mains a superimposed hum voltage will be directly transferred to the input of the central amplifier and will lock the amplifier in either speech direction.

By connecting each end of the line wires to a relay coil and by sending a release pulse only when the connection is to be released the advantage is attained, in accordance with the instant invention, that the line wires are kept free of direct current during the period of conversation and thus that the above-mentioned drawback is avoided.

In accordance with the invention the speech connection is released in the following manner:

During conversation the loop is utilized as is illustrated by FIG. 4, inasmuch as in the outgoing and incoming TLR's the loop is held closed over the two relays T4, and specifically over the respective contact pairs 1 and 2 of said relays. In release from one side, for instance the outgoing side (exchange A), relay T4 on this side is disconnected and thereafter relay T5 releases with a delay over contact pair 3. During the release period of relay T5 positive polarity is sent out on line wire L*a* over contact pair 4 and negative polarity on line wire L*b* over contact pair 5. These polarities cause relay T11 in the incoming TLR (exchange B) to operate. The operation of relay T11 makes relay T16 operate over contact pair 6, whereby the holding circuit towards the exchange equipment is opened over contact pair 7 of relay T16 and the extension is released.

The invention is not limited to the embodiment described above and illustrated in the drawing, as this embodiment merely is an example of the invention and its utilization.

What is claimed is:

1. Intertraffic equipment for loudspeaker private branch exchanges comprising:
- an outgoing exchange,
- said outgoing exchange including a first central amplifier to provide amplified signals proportioned to signals received by the outgoing exchange,
- a compression amplifier having an input side and an output side,
- means connecting said input side to receive said amplified signals,
- said compression amplifier functioning to proportionally reduce the amplitude of the amplified signals to produce on its output side desired signals approaching the zero level,
- a trunk line including a first hybrid coil and a second hybrid coil,
- means coupling said output side to the first hybrid coil,
- a receiving exchange,
- means coupling said receiving exchange to the second hybrid coil,
- said receiving exchange including a second central amplifier and a pre-amplifier,
- said pre-amplifier having an input side coupled to said second hybrid coil and an output side coupled to said second central amplifier,
- said pre-amplifier functioning to receive said desired signals and to increase their amplitude to a level suitable for further amplification by the second central amplifier,
- a relay in each exchange for releasing the trunk line,
- the trunk line being held at a relatively low voltage by the compression amplifier during conversation, and
- each of said relays being made responsive to a release pulse provided when either exchange is released, said relays responding to the release pulse to release the trunk.

References Cited

UNITED STATES PATENTS

| | | | |
|---|---|---|---|
| 1,593,933 | 7/1926 | Fish. | |
| 2,049,941 | 8/1936 | Bjornson | 179—170.8 |
| 2,535,681 | 12/1950 | Johnson. | |
| 2,757,246 | 7/1956 | Radcliffe | 179—170.8 |

KATHLEEN H. CLAFFY, Primary Examiner

U.S. Cl. X.R.

179—170.8